Sept. 12, 1967      W. I. NEU      3,340,941
ELECTRIC BABY WALKER
Filed May 3, 1965
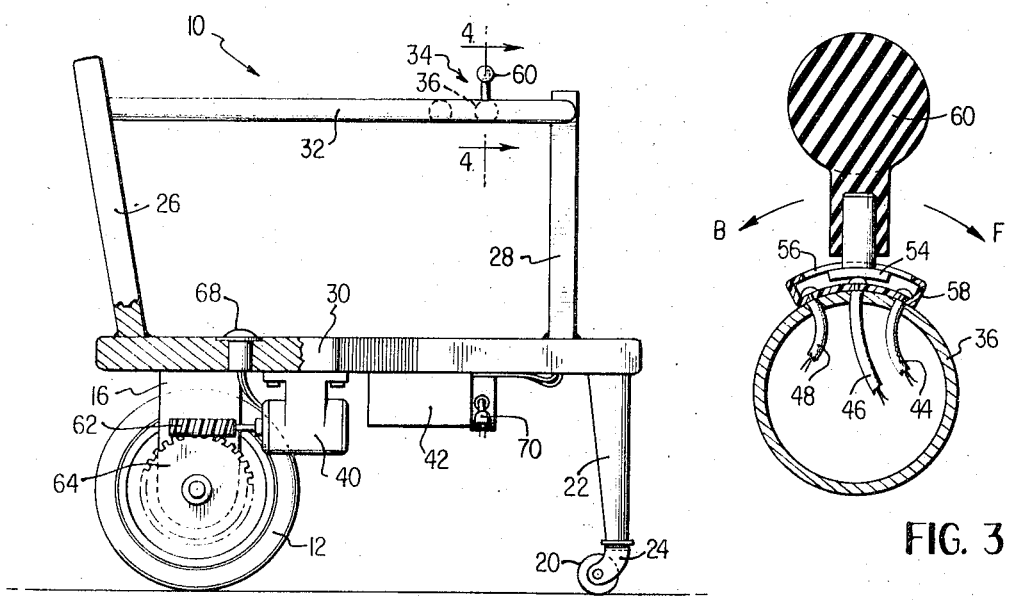
FIG. 1
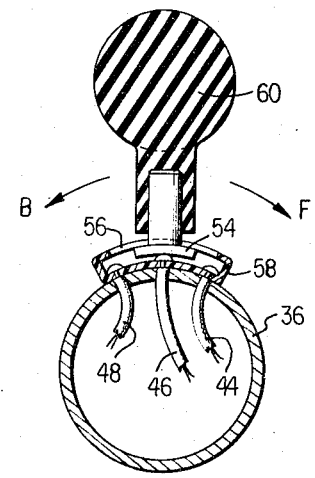
FIG. 3
FIG. 2
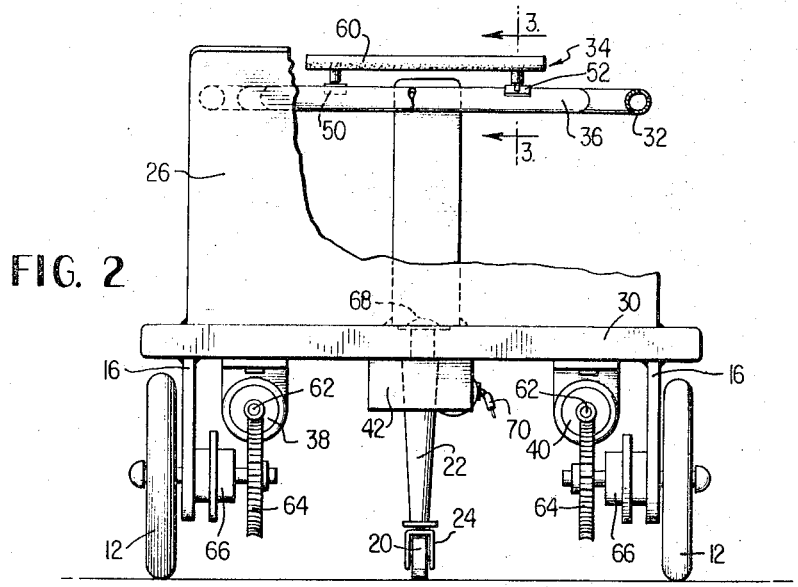
FIG. 4
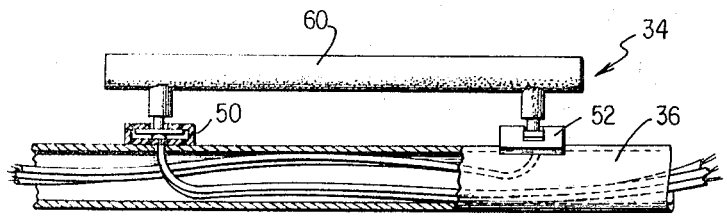
INVENTOR
WALLACE I. NEU
BY Sughrue, Rothwell, Mion, Zinn, & Macpeak
ATTORNEYS.

United States Patent Office 3,340,941
Patented Sept. 12, 1967

3,340,941
ELECTRIC BABY WALKER
Wallace I. Neu, 308 E. Ave. E, Alpine, Tex. 79830
Filed May 3, 1965, Ser. No. 452,481
1 Claim. (Cl. 180—6.5)

The present invention relates generally to baby walkers, and more specifically to a power operable baby walker for aiding infants in learning to walk.

Several devices have been placed on the market for helping infants to learn to walk. Most of these devices comprise a frame adapted to support the child with his legs extending downwardly and contacting the floor or ground. The frame is mounted on wheels, whereby the child may propel the walker by moving his legs, and includes a bar which encircles the child and may be grasped by him to support himself in a standing position.

While such devices have been somewhat effective, they rely upon the child's own motivation in learning to walk. Studies which have been made of the movements and habit patterns of pre-walking age children have indicated that if they are physically motivated; that is, bodily urged in a forward direction while standing, they will start to move their legs and learn to walk sooner. Accordingly, it is one of the objects of the present invention to provide a baby walker which automatically physically motivates an infant to help him learn to walk.

It is a further object of the present invention to provide such a baby walker which is adapted to be operated by an infant.

The foregoing and other objects, features and advantages of the invention will be apparent from the following more particular description of a preferred embodiment of the invention, as illustrated in the accompanying drawings.

In the drawings:

FIGURE 1 is a side elevation, partly in section, of a baby walker constructed in accordance with the teachings of the present invention;

FIGURE 2 is a rear elevation, with parts broken away, of the walker of FIGURE 1;

FIGURE 3 is a section view taken along the line 3—3 of FIGURE 2 and showing the details of one of the control switches of the walker; and FIGURE 4 is a rear elevation, partly in section and with parts broken away, of the entire control switch mechanism looking along the line 4—4 of FIGURE 1.

Referring now to the drawings, there is shown an electrically powered baby walker which includes a frame 10 mounted on rear wheels 12, 14 by means of brackets 16, 18, and on a front wheel 20 by means of a leg 22 and swivel castor 24. The frame includes a back portion 26, a front portion 28, a seat portion 30, and a substantially U-shaped grasping bar 32 which extends between the front and back portions on either side of the walker and encircles a child seated thereon.

The walker may be power driven, and for this purpose electric motors 38, 40 are mounted on the frame 10 and are operatively connected to each of the rear wheels 12, 14 for driving same. The motors are driven by means of a suitable power supply source, such as a battery 42 which is also mounted on the frame 10. The motors are reversible so that the walker may be propelled in either a forward or backward direction, and are electrically connected to the battery 42 by suitable circuit means including positive, center tap and negative wires 44, 46, 48, respectively.

A control switch mechanism 34 is mounted on a crossbar 36 which extends across the U-shaped grasping bar 32, and is disposed in the circuit means between the battery 42 and motors 40 for selectively electrically connecting the motors to the battery to drive the wheels and propel the walker. As best shown in FIGURES 2 and 4, the control switch mechanism 34 includes first and second switches 50, 52, each of which is connected between the battery and one of the motors. As shown in FIGURE 3, the switches may be of the "rocker" type which are commonly used to operate power driven automobile windows. Each includes a curved contact plate 54 adapted to ride in a groove 56 in a housing 58 mounted on the cross-bar 36. When a contact plate is moved to the forward position F, it will connect the center tap 46 and positive wire 48 to operate the associated motor and drive its associated wheel in a forward direction (as viewed in FIGURE 1). When the contact plate 54 is moved to the backward position B, it will operate the associated motor to drive its associated wheel in a backward direction. As shown in FIGURE 4, the right hand switch 52 may be connected to the left rear wheel 12 (looking at FIGURE 2), and the left hand switch 50 may be connected to the right rear wheel 14. Thus, when the right hand switch is moved forward the left rear wheel will be driven forward and the walker will move toward the right, and when the left hand switch 50 is moved to the forward position, the right rear wheel will be driven forward to propel the walker toward the left.

A control bar 60 is connected adjacent each of its ends to one of the switches 50, 52 for operating them. The bar may be made of a slightly flexible material, such as molded rubber, so that if the baby pushes or pulls on only one end of the bar, only one of the switches 50, 52 will be operated, only one of the rear wheels will be driven, and the walker will be propelled toward the right or left; but if the baby pushes on the middle of the bar, or on both ends, both wheels will be driven to propel the walker along a substantially straight path.

Also provided in the circuit between the battery 42 and motors 38, 40 is a safety switch 68 for insuring that the walker may not be power driven to trip or harm the child when he is not seated. The switch 68 may be a normally open, pressure-closable type, and is disposed on the seat portion 30 of the frame 10. All of the circuit wires pass through this switch so that the motors will not be electrically connected to the battery, and cannot be driven unless the child is seated to close the safety switch 68. It should be noted that the circuit wires 44, 46, 48 are hidden from the baby, passing from the battery 42, through the front portion 28 and bars 32 and 36 of the frame to the control switches 50, 52, and back through the bars 36, 32, the front portion 28, the seat portion 30 and the safety switch 68 to the motors 38 and 40.

As best shown in FIGURES 1 and 2, each of the motors 38, 40 is drivingly connected to its associated wheel by means of a worm gear 62 and gear wheel 64; and an electrically operated clutch 66 is provided between each gear wheel and its associated wheel to disconnect the wheel from the motor and permit it to turn freely when the motor is not operating. The clutch is activated to couple the motor and wheel when, and only when, the motor is activated to drive the wheel. This will permit the baby to stand and move the walker himself in a conventional manner without having to overcome the resistance to turning which the motors would otherwise impose on the rear wheels when not driving them.

The battery 42 may be a nickel cadmium rechargeable type provided with a small rectifier network (not shown) attached to it so that a short AC cord 70 may be pulled out and plugged into a suitable electrical outlet whenever recharging is necessary.

From the foregoing, operation of the walker is apparent. When the child is seated, the safety switch 68 will be closed, and when the control switch bar 60 is moved forward or backward, wires 44 and 46, or 46 and 48, will be connected by one or both of switches 50, 52, and battery 42 will power one or both of motors 38, 40 to drive one or both of the rear wheels 12, 14. When the child stands, the switch 68 will be open, and no electrical power will be delivered to either of the motors. The electrical clutches 66 will then decouple the wheels 12, 14 from motors 38, 40, whereby the wheels will be free-turning to permit the child to move the walker by himself.

While the invention has been particularly shown and dscribed with reference to a preferred embodiment thereof, it will be understood by those skilled in the art that various changes in form and details may be made therein without departing from the spirit and scope of the invention.

What is claimed is:

In combination with a baby walker having a frame including a seat portion adapted to support an infant in a seated position and having at least two drive wheels attached thereto for rotation about the wheel axes, reversible electric motor means mounted on said frame for relatively driving said wheels, electrical power supply means mounted on said frame, and electrical circuit means connecting said motor means to said electrical power supply means, said circuit means including a control switch including an elongated flexible control bar having one of its ends connected to first switch means for controlling the rotation of one of said wheels and having its other end connected to second switch means for controlling the rotation of the other of said wheels, each of said first and second switch means including means for selectively connecting said motor means to said power supply means to drive said motor means in either a forward or reverse direction.

References Cited
UNITED STATES PATENTS

| | | |
|---|---|---|
| 2,224,411 | 12/1940 | Smith. |
| 2,911,053 | 11/1959 | Ayers et al. _____ 180—82 |
| 3,100,547 | 8/1963 | Rosenthal _____ 180—6.5 |

BENJAMIN HERSH, *Primary Examiner.*

J. A. PEKAR, *Assistant Examiner.*